United States Patent Office 3,743,631
Patented July 3, 1973

3,743,631
PROCESSING OF CATALYST-CONTAINING POLYISOPRENE SOLUTIONS
Manfred Beck, Johann Schüchter, Günter Marwede, and Egon Kuntz, Leverkusen, Germany, assignors to Bayer Aktiengesellschaft, Leverkusen, Germany
No Drawing. Filed Aug. 4, 1971, Ser. No. 169,086
Claims priority, application Germany, Aug. 8, 1970, P 20 39 493.8
Int. Cl. C08d 5/02, 5/04
U.S. Cl. 260—94.7 N    13 Claims

ABSTRACT OF THE DISCLOSURE

A process for isolating polyisoprene from a catalyst-containing solution thereof in an organic solvent, wherein
(1) The catalyst is deactivated in the polymer solution with an aqueous or alcoholic solution of a hydroxide of a metal of Groups 1A or 2A of the Periodic System;
(2) The deactivated solution is washed with water, stabilisers and/or modifiers optionally being added in stage 1 or stage 2;
(3) The aqueous or aqueous/alcoholic phase is separated off;
(4) An aliphatic diamine or polyamine is added, and
(5) The organic solvent is removed by steam distillation.

---

Polyisoprene is normally produced by polymerising isoprene in solution in an organic solvent (for example a hydrocarbon) with an organometallic mixed catalyst (Ziegler catalysts). These polymerisation reactions normally yield 8 to 20% by weight polyisoprene solutions which initially still contain the active catalyst. In order to recover the solid polyisoprene, the catalyst is deactivated, the polymer is stabilised and the organic solvent is subsequently removed. This is usually done by steam distillation ("stripping") of the organic solution, followed by drying of the polymer.

The organometallic catalysts used for polymerisation, for example combinations of salts of metals of Groups IV, V, VI or VIII of the Periodic System with organometallic compounds of Groups I, II and III of the Periodic System, almost always contain chlorine, because the chlorides (for example $TiCl_4$) are preferably used as the metal salts. When the polyisoprene solutions are processed considerable quantities of chlorine, usually around 1500 p.p.m. (weight) remain in the polyisoprene, adversely affecting the properties of the polymer. This applies in particular when diamines or polyamines are used for deactivation, e.g. in accordance with British Pat. No. 1,177,909). Although the properties of the polymer recovered in this way especially its thermal stability, are satisfactory, its chlorine content is extremely high.

Catalysts in polydiene solutions have also been deactivated with aqueous metal hydroxide solutions. Although products of low chlorine content are obtained by this process, their properties, especially their thermal stability, are far from satisfactory.

The object of the present invention is to provide a method by which polyisoprene which has low chlorides content and satisfactory polymer properties can be isolated from a catalyst-containing polyisoprene solution. The chlorides have to be removed from the polymer because they interfere with further processing of the rubber and, more particularly, attack metal apparatus used in further processing.

Accordingly, the invention relates to a process for isolating polyisoprene from a catalyst-containing solution thereof in an organic solvent, wherein (1) The catalyst is deactivated in the polymer solution with an aqueous or alcoholic solution of a hydroxide of a meal of Groups 1A or 2A of the Mendeleeff Periodic Table of Elements (see Handbook of Chemistry and Physics, 47th edition, page B–3);
(2) The deactivated solution is washed with water, stabilisers and/or modifiers optionally being added in stage 1 or stage 2;
(3) The aqueous or aqueous/alcoholic phase is separated off;
(4) An aliphatic diamine or polyamine is added, and
(5) The organic solvent is separated off by steam distillation.

If the process is to be successful, the individual stages must be carried out in the order indicated.

The process according to the invention can be carried out with any solution of polyisoprene in organic solvents of the kind obtained during conventional solution polymerisation with organometallic mixed catalysts. Especially suitable are 8 to 20% by weight solutions in hydrocarbons or chlorohydrocarbons, such as benzene, chlorobenzene, toluene or hexane.

Particularly suitable aqueous or alcoholic solutions of metal hydroxides of the Groups 1A or 2A of the Periodic Table include 1 to 50% by weight solutions of sodium hydroxide in water, methanol or ethanol. The quantity in which they are used is governed by the quantity of chlorine present, and is usually from 10 to 1000 mol percent of OH group based on chlorine, and is preferably from 100 to 400 mol percent of OH group.

The water used for washing is preferably employed in a quantity of from 1 to 300% by weight, based on the polymer solution, most preferably in a quantity of from 1 to 70% by weight.

Any of the usual stabilisers can be used, for example phenolic stabilisers such as 2,6-di-t.-butyl-3-methyl-phenol or 2,2' - dihydroxy - 3,3' - di-t.-butyl - 5,5'-dimethyl diphenyl methane, preferably in quantities of from 0.1 to 2% by weight, based on solid polyisoprene.

Dialkyl monoamines one of whose alkyl groups contains at least 10 carbon atoms are particularly suitable modifiers. N-methyl stearylamine is mentioned by way of example.

Aliphatic diamines and polyamines suitable as additives include alkylene diamines such as ethylene diamine, propylene diamine, 1,4 - diaminobutane, tetramethyl ethylene diamine and N-methyl propylene triamine; and alkylene polyamines such as diethylene triamine, dipropylene triamine and tetraethylene pentamine. They are preferably used in quantities of from 0.01 to 1.0% by weight, most preferably in quantites of from 0.02 to 0.5% by weight, based on the polyisoprene.

In general, the process can be carried out by initially mixing the polyisoprene solutions and hydroxide solutions in a mixer, optionally mixing in a stabiliser and/or modifier, followed by washing with water and removal of the aqueous phase. Diamines of polyamines are then added and the solvent removed either with water or with steam.

The process is preferably carried out continuously. To this end, the hydroxide solution and, optionally, stabiliser and modifier are mixed in a continuously operating machine, the mixture is transferred into a second continuously operating mixer in which the water (and optionally stabiliser and modifier) is mixed in, and the water is separated off and transferred to a third mixer in which the diamine or polyamine is introduced, followed by coagulation in a following steam distillation stage.

By virtue of the process according to the invention, it is possible to obtain polyisoprene which is substantially free from chlorine (around 450 p.p.m.) and which shows outstanding thermal stability and a light natural colour.

In the following examples all parts and percentages are by weight, unless otherwise indicated. The abbreviation p.h.m. means parts (by weight) per 100 parts (by weight) of monomer.

EXAMPLE 1

A polyisoprene solution in hexane (solids content 8 to 10%) prepared continuously using a Ziegler catalyst was stopped in a through-flow mixer by the addition of an aqueous NaOH solution (110% of NaOH, based on the chlorine content of the catalyst). A solution in hexane of di-tert.-butyl methylphenol (0.5 p.h.m.) and N-methyl stearylamine (0.4 p.h.m.) was introduced into the same mixer. Water (70%, based on the polymer solution) was mixed with the slopped polyisoprene solution in a second mixer. Finally, following separation of the water, 0.19 p.h.m. of ethylene diamine were introduced in a third mixer. The polymer was then precipitated by steam distillation, freed from any water adhering to it and dried. Reduction of Mooney viscosity ML–4′ after storing at 70° C. for two weeks was 20 units.

Comparison examples (A) If the procedure is as in Example 1, but without the addition of ethylene diamine, light products of low chlorine content (0.04%) are again obtained. However, the thermal stability of the rubber is far from satisfactory. After storage for only two weeks at 70° C. samples of this material was flown apart, and no Mooney viscosity could be determined.

(B) If the ethylene diamine is added together with the NaOH solution in a procedure otherwise the same as in Example 1, products of high chlorine content ($\geq 0.1\%$) and unsatisfactory thermal stability (reduction of Mooney viscosity ML–4′ by 45 units after two week's storage at 70° C. are obtained.

(C) If the procedure is as in Comparison Example B, except that the NaOH is left off, products with an undesirably high chlorine content of from 0.1 to 1.5% are obtained. The stability of the products is good.

EXAMPLE 2

The polymer solution was processed in the same way as described in Example 1, except that the stabiliser (di-tert.-butyl methylphenol) and the N-methyl stearylamine were introduced into the washer/mixer in the form of a solution in hexane.

The result obtained was the same as that of Example 1. The products have a light natural colour and a low chlorine content (less than 0.045%). Their thermal stability is excellent. Reduction of Mooney viscosity ML–4′ by 20 units after two week's storage at 70° C.

EXAMPLE 3

Processing was as in Example 1 except that a quantity of 440% of NaOH, based on chlorine in the catalyst, was used for stopping, whilst the ethylene diamine was used in a quantity of only 0.04 p.h.m. as opposed to 0.19 p.h.m.

The product had a chlorine content of 0.048%. The thermal stability of the light rubber was outstanding. (Reduction of Mooney viscosity ML–4′ by 12 units after two week's storage at 70° C.).

Comparison example

Processing was as in Example 3, except that the ethylene diamine was omitted, again resulting in light products of low chlorine content but with unsatisfactory thermal stability Mooney viscosity ML–4′, reduction after two weeks at 70° C.: 74 units.

EXAMPLE 4

The procedure was as in Example 1, except that diethylene triamine was used instead of ethylene diamine. A light product with a chlorine content of 0.039% was obtained. A decrease in the Mooney-viscosity ML–4′-value of only about 17 units occurred during storage under heat (two weeks at 70° C.).

What is claimed is:

1. A process for isolating polyisoprene from a solution thereof in an organic solvent wherein an active chlorine containing organometallic mixed catalyst is present which process comprises:
   (i) deactivating said catalyst in the polyisoprene solution by adding an aqueous or alcoholic solution of a hydroxide of a metal of Groups IA or IIA of the Mendelejeff Periodic Table in a quantity sufficient to provide from 10 to 1000 mol percent of OH groups based on chlorine,
   (ii) washing the resulting deactivated solution with water in an amount of from 1 to 300% by weight based on the weight of the solution,
   (iii) separating the resulting aqueous or aqueous/alcoholic phase,
   (iv) adding an aliphatic diamine or polyamine to the organic solvent solution of polyisoprene in an amount of from 0.01 to 1.0% by weight, based on the weight of polyisoprene and then
   (v) recovering the polyisoprene by steam-distilling the organic solvent.

2. A process as claimed in claim 1 wherein the polyisoprene solution is an 8 to 20% by weight solution in a hydrocarbon or chlorohydrocarbon.

3. A process as claimed in claim 1, wherein the metal hydroxide solution used in step (i) is a 1 to 50% by weight solution of sodium hydroxide in water, methanol or ethanol.

4. A process as claimed in claim 1, wherein the metal hydroxide is used in a quantity sufficient to provide from 100 to 400 mol percent of OH group, based by chlorine.

5. A process as claimed in claim 1, wherein the quantity of water is from 1 to 70% by weight, based on polymer solution.

6. A process as claimed in claim 1 wherein a stabiliser, modifier or mixture thereof is added during step (i) or (ii).

7. A process as claimed in claim 6 wherein the stabilizer is 2,6-di-t.-butyl-3-methyl-phenol or 2,2′-dihydroxy-3,3′-di-t.butyl-5,5′-dimethyl diphenyl methane.

8. A process as claimed in claim 6, wherein the quantity of stabilizer is from 0.1 to 2% by weight, based on solid polyisoprene.

9. A process as claimed in claim 6, wherein the modifier is a dialkyl monoamine one of whose alkyl groups has at least 10 carbon atoms.

10. A process as claimed in claim 6, wherein the modifier is N-methyl stearylamine.

11. A process as claimed in claim 1, wherein the aliphatic diamine is ethylene diamine propylene diamine, 1,4-diaminobutane, tetramethyl ethylene diamine or N-methyl propylene triamine.

12. A process as claimed in claim 1, wherein the aliphatic polyamine is diethylene triamine, dipropylene triamine or tetraethylene pentamine.

13. A process as claimed in claim 1, wherein the quantity of the aliphatic diamine or polyamine is from 0.02 to 0.5% by weight, based on polyisoprene.

References Cited

UNITED STATES PATENTS

| | | | |
|---|---|---|---|
| 3,269,997 | 8/1966 | Lyons et al. | 260—94.9 |
| 3,544,542 | 12/1970 | Witte et al. | 260—94.7 |
| 3,663,727 | 5/1972 | Yamamoto et al. | 260—94.7 RX |

JAMES A. SEIDLECK, Primary Examiner

W. F. HAMROCK, Assistant Examiner

U.S. Cl. X.R.

260—45.95, 45.9, 85.1, 94.7 A, 96 R